United States Patent
Lee

(10) Patent No.: US 8,107,132 B2
(45) Date of Patent: Jan. 31, 2012

(54) IMAGE FORMING APPARATUS AND CONTROL METHOD THEREOF

(75) Inventor: Jae Kyu Lee, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 709 days.

(21) Appl. No.: 12/181,505

(22) Filed: Jul. 29, 2008

(65) Prior Publication Data

US 2009/0073504 A1 Mar. 19, 2009

(30) Foreign Application Priority Data

Sep. 18, 2007 (KR) .................. 10-2007-0094504

(51) Int. Cl.
*H04N 1/40* (2006.01)
(52) U.S. Cl. ....... 358/461; 358/467; 358/3.26; 358/406; 348/223.1
(58) Field of Classification Search .................. 358/461, 358/3.26, 406, 347; 348/223.1
See application file for complete search history.

(56) References Cited

U.S. PATENT DOCUMENTS

| | | | |
|---|---|---|---|
| 2003/0099000 A1 | 5/2003 | Hiromatsu | |
| 2003/0184660 A1* | 10/2003 | Skow | 348/223.1 |
| 2004/0207883 A1* | 10/2004 | Han | 358/3.26 |
| 2004/0263915 A1* | 12/2004 | Park | 358/461 |

FOREIGN PATENT DOCUMENTS

| | | |
|---|---|---|
| CN | 1538733 | 10/2004 |
| KR | 2005-112918 | 12/2005 |

OTHER PUBLICATIONS

European Search Report issued Jun. 3, 2009 in EP Application No. 08161924.9.
Chinese Office Action issued Mar. 9, 2010 in CN Application No. 2008102113102.

* cited by examiner

*Primary Examiner* — Twyler Haskins
*Assistant Examiner* — Michael Burleson
(74) *Attorney, Agent, or Firm* — Stanzione & Kim, LLP

(57) ABSTRACT

An image forming apparatus and a control method thereof are disclosed. The disclosed image forming apparatus includes a white reference sheet provided at one side of a flat bed, for scanning an object, an image sensor module including an image sensor to detect light reflected from the white reference sheet in a scanning operation for the white reference sheet and light reflected from an image on the object in a scanning operation for the object, and to output analog image signals respectively corresponding to the reflected lights, an analog front end (AFE) to convert each analog image signal output from the image sensor to a digital image signal, a shading memory to store shading data obtained in the scanning operation for the white reference sheet, and a controller to calculate differences among outputs from R, G, and B channels of the image sensor, using the stored shading data, to correct the stored shading data, based on the calculated output differences, and to correct image data outputs generated from the R, G, and B channels in the scanning operation for the object, based on the calculated output differences. The image forming apparatus can correct different physical offset values possibly present at different color channels in a color scanning operation. Accordingly, it is possible to adjust the color balance of a scanned image, and thus to achieve an enhancement in the color quality of the image.

14 Claims, 9 Drawing Sheets

IMAGE FORMING APPARATUS AND CONTROL METHOD THEREOF

CROSS-REFERENCE TO RELATED APPLICATIONS

This application claims the priority and benefit of Korean Patent Application No. 10-2007-94504, filed on Sep. 18, 2007 in the Korean Intellectual Property Office, the disclosures of which are incorporated herein by reference, in its entirety.

BACKGROUND OF THE INVENTION

1. Field of the Invention

The present general inventive concept relates to an image forming apparatus and a control method thereof, and, more particularly, to an image forming apparatus and a control method thereof, in which the color balance of a scanned image is corrected through an offset correction for an image signal output from an image sensor module, to achieve an enhancement in image quality.

2. Description of the Related Art

An image forming apparatus is well known for scanning an image of a document, creating image data, and rendering the image data into a visual image on paper. Various image forming apparatuses having various functions are known. Examples of such image forming apparatuses include a printer, a scanning unit, a facsimile machine, a copy machine and a complex machine having the functions of the above-mentioned appliances.

A general image forming apparatus, for example, a scanning unit, includes a stage glass, on which a document is laid, and a scanning head to read an image of the document while reciprocating beneath the stage glass. The scanning head includes a light source module to scan light to the document, and an image sensor to detect light reflected from the document and to convert the detected light to an image signal. The image sensor may be implemented through a charge coupled device (CCD) or a constant image sensor (CIS).

In the general image forming apparatus, the image signal generated from the image sensor may be distorted due to a deviation in the amount of light generated from the light source module or a non-uniformity of the light amount. Such a phenomenon is called "shading." Due to such a shading phenomenon, an image signal having a shape different from the image of the document may be generated. Therefore, it is necessary to correct the shading phenomenon incurred in the image signal. In a typical shading correction method, a white reference sheet provided at one side of a flat bed is scanned prior to the scanning of a document, to obtain reference shading data. An image signal, which is obtained in accordance with the scanning of the document, is then compared with the reference shading data, to determine black or white pixels. Based on the determined black or white pixels, shading correction is executed.

Meanwhile, the signal output from the image sensor, which has the form of an analog signal, has an offset value due to the physical characteristics of the circuit of the image sensor. In particular, when the image sensor includes R, G, and B channels, signals output from the R, G, B channels have offset values having different levels as they pass through independent circuits, respectively. For this reason, black reference shading data for one channel is different from those for other channels. As a result, the signals output from respective channels exhibit an amplified level difference as they are processed through an image pre-processing procedure. Consequently, the scanned image exhibits color shift.

SUMMARY OF THE INVENTION

The present general inventive concept provides an image forming apparatus and a control method thereof, in which R, G, and B signals output from an image sensor module are corrected for black level offset, to adjust the color balance of a scanned image, and thus to achieve an enhancement in the color quality of the image.

Additional aspects and/or advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including a white reference sheet provided at one side of a flat bed, on which an object to be scanned is laid, an image sensor module including an image sensor to detect light reflected from the white reference sheet in a scanning operation for the white reference sheet and light reflected from an image on the object in a scanning operation for the object, and to output analog image signals respectively corresponding to the reflected lights, an analog front end to convert each analog image signal output from the image sensor to a digital image signal, a shading memory to store shading data obtained in the scanning operation for the white reference sheet and a controller to calculate differences among outputs from R, G, and B channels of the image sensor, using the stored shading data, to correct the stored shading data, based on the calculated output differences, and to correct image data outputs generated from the R, G, and B channels in the scanning operation for the object, based on the calculated output differences.

The foregoing and/or other aspects and utilities of the present general inventive concept may be achieved by providing a method of controlling an image forming apparatus, the method including scanning a white reference sheet by an image sensor, to obtain shading data, calculating outputs from R, G, and B channels of the image sensor, based on the obtained shading data, calculating differences among the outputs from the R, G, and B channels, based on the calculated output values; and correcting the stored shading data, based on the calculated output differences, and correcting image data outputs generated from the R, G, and B channels in a scanning operation for an object, based on the calculated output differences.

The foregoing and/or other aspects and utilities of the present general inventive concept may be achieved by providing an image forming apparatus including a shading memory to store shading data according to a signal to correspond to a reference sheet, a controller to correct the stored shading data according to a difference among a plurality of color channels of image data, and to correct the image data according to the corrected shading data.

The controller may use output values for dummy pixels generated from the plurality of color channels of the image sensor and include in the stored shading data, to calculate the outputs from the plurality of color channels.

The controller may calculate a mean value of the dummy pixel output values generated from each of the plurality of color channels, to calculate the outputs from the plurality of color channels.

The controller may store the calculated mean value associated with each of the plurality of color channels in the shading memory.

The controller may apply the calculated difference between the output from a specific one of the plurality of color channels and each of the remaining two channels other than the specific channel, to an associated value of the shading data through an addition or deduction operation, to correct the shading data.

The controller may apply the calculated differences among the outputs from the plurality of color channels to the associated image data outputs, respectively, through an addition or deduction operation, to correct the image data outputs.

The image forming apparatus may be a scanning unit or a complex machine.

The image forming apparatus may include an analog front end to convert each analog image signal output from the image sensor to a digital image signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings in which.

DETAILED DESCRIPTION OF THE PREFERRED EMBODIMENTS

Reference will now be made in detail to the embodiments of the present general inventive concept, examples of which are illustrated in the accompanying drawings. The embodiments are described below to explain the present general inventive concept by referring to the figures.

An image forming apparatus according to an exemplary embodiment of the present general inventive concept may be a scanning unit, a copying machine, a complex machine, or the like. The image forming apparatus performs operations to scan an image formed on an object to be read, and to generate an image signal corresponding to the scanned image. The image forming apparatus transfers the generated image signal to an external host computer, or performs image processing for the generated image signal, to form an image on a certain recording medium, using an image former included in the image forming apparatus.

Figure 1:
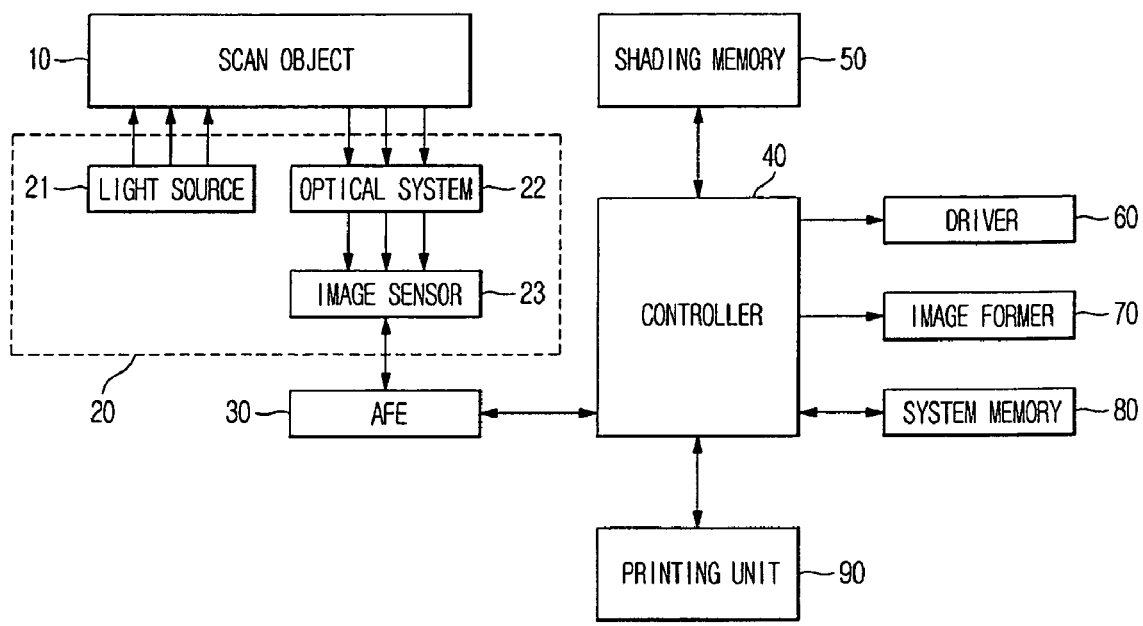
FIG. 1 is a block diagram illustrating an image forming apparatus according to an exemplary embodiment of the present general inventive concept.

As shown in FIG. 1, the image forming apparatus according to the illustrated embodiment of the present general inventive concept includes an image sensor module 20, an analog front end (AFE) 30, a controller 40, a shading memory 50, a driver 60, an imager former 70, and a system memory 80.

In the illustrated embodiment, the image sensor module 20 includes a light source 21 to emit desired light to an image formed on an object 10 to be scanned (hereinafter, referred to as a "scan object"), such as a document, an image sensor 23 to receive light reflected from the image and to generate an electrical signal corresponding to the reflected light and an optical system 22 including lenses, etc., arranged between the scan object 10 and the image sensor 23, to appropriately guide the reflected light to reach the image sensor 23.

Figure 2:
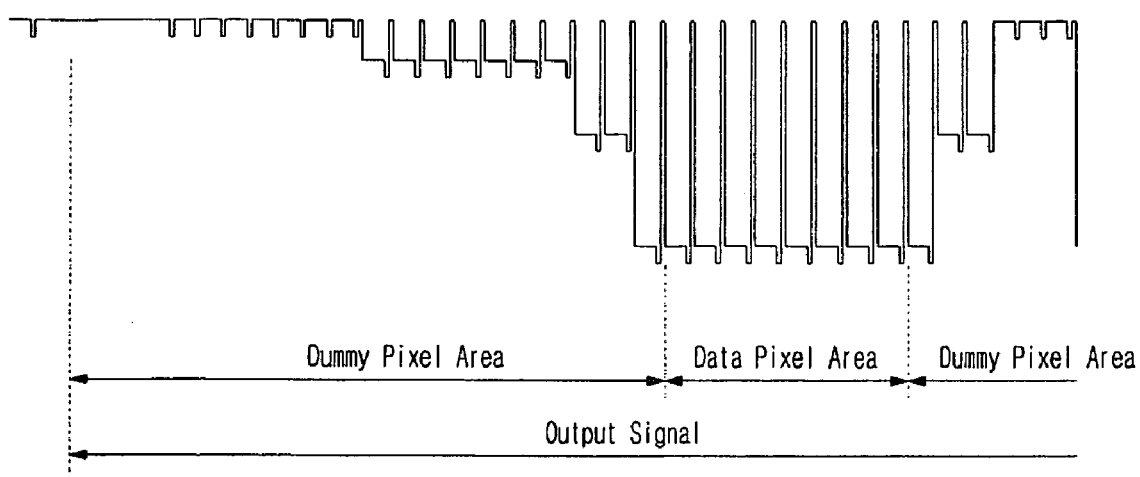
FIG. 2 is a graph illustrating output characteristics of an image sensor shown in FIG. 1.

In the illustrated embodiment, the image sensor 23 may be a charge coupled device (CCD) or a constant image sensor (CIS). The image sensor 23 may be a linear sensor array including opto-electronic converters arranged in a horizontal scan direction for the image. As illustrated in FIG. 2, the light source 21 scans the scan object 10 in the unit of line pixels in a direction orthogonal to the direction of movement of the image sensor module 20, and thus the image sensor 23 generates an output signal. The output signal includes both dummy pixel areas and data pixel areas. The dummy pixel areas are positioned at opposite sides of actual data of the data pixel area generated when the image is canned. Although such dummy pixel areas are not included in scanned data, they are included in a normal output signal of the image sensor module 20.

Signals of the dummy pixel areas correspond to a signal, generated from an area or a reference area other than the scan object 10. It is possible that the signal of the dummy pixel area corresponds to a portion of the scan object 10 other than to the actual data area.

The image forming apparatus may further include a printing unit 90 to print or copy the image data. It is possible that shading memory 50, controller 40, driver 60, image former 70 and/or system memory 80 can be implemented in a PC connectable to 30, and scan object 10, image sensor module 20 and AFE 30 may be in a scanner connectable to the PC.

The AFE 30 generates a clock signal to be applied to the image sensor 23. The AFE 30 also converts an analog image signal obtained in accordance with a scanning operation of the image sensor 23 for an image to a digital image signal, in accordance with an analog-to-digital (A/D) conversion.

The shading memory 50 is a memory used in a shading correcting operation of the controller 40. In the shading memory 50, reference shading data for black and white is stored.

The controller 40 controls the overall operation of the image forming apparatus. That is, the controller 40 controls operations of respective constituent elements of the image forming apparatus. The controller 40 controls the light source 21 and image sensor 23 so that the image signal generated in accordance with the scanning operation of the image sensor module 20, namely, the scanned image signal, can be represented by a plurality of pixels arranged in a two-dimensional plane. The controller 40 also performs a shading correction for the scanned image signal and a black level offset correction for the components of the scanned image signal respectively corresponding to R, G, and B channels. In addition, the controller 40 performs a desired image processing operation for the shading and offset-corrected image signal.

The driver 60 transmits drive power generated from a motor included in the driver 60 to the image sensor module 20 via a power transmission member, to move the image sensor module 20.

The image former 70 records the image signal on a recording medium, to form a corresponding image on the recording medium.

The system memory 80 is a main memory used in operations of the controller 40. The system memory 80 stores a program, namely, a set of commands associated with the operations of the controller 40.

As described above, the components of the analog signal respectively output from the R, G, and B channels of the image sensor module 20 have different offset values due to different physical characteristics of the associated circuits and elements. The analog signal is converted to a digital signal while passing through the AFE 30. In the AFE 30, the digital signal is also subjected to a digital black level correction, to correct the offset values thereof. However, even when identical elements are used for the R, G, and B channels of the image sensor module 20, there may still be an offset value difference among the signal components corresponding to the R, G, and B channels after the offset correction because the physical characteristics of the elements are slightly different.

Due to the offset value difference among the signal components corresponding to the R, G, and B channels, black-level reference data used to obtain shading data for one channel becomes different from those for other channels. As a result, the R/G/B color balance of the signal components is failed in association with a color approximate to black after the signal components are subjected to an image pre-processing procedure including, for example, a shading correction and a gamma correction. Consequently, it is possible that the resultant image exhibits color shift to a certain color.

To this end, in the illustrated embodiment, respective offset values of R, G, and B digital signals output from the AFE 30 are corrected, to adjust the color balance of each color signal, and thus to achieve an improvement in the color quality of the scanned image.

For this correction, the controller 40 performs various control operations. That is, controller 40 optically controls the image sensor module 20 to be to a white reference sheet provided at one side of a flat bed, on which the scan object 10 is laid. As the image sensor module 20 scans the white reference sheet, shading data is obtained. After storing the shading data, the controller 40 calculates, from the shading data, a mean value of output values from each of the R, G, and B channels of the image sensor 23 for dummy pixel areas. The controller 40 also calculates a difference among dummy pixel mean values respectively corresponding to the R, G, and B channels. Thereafter, with reference to the offset value associated with one channel, the controller 40 corrects the offset values associated with the remaining channels.

Figure 3:
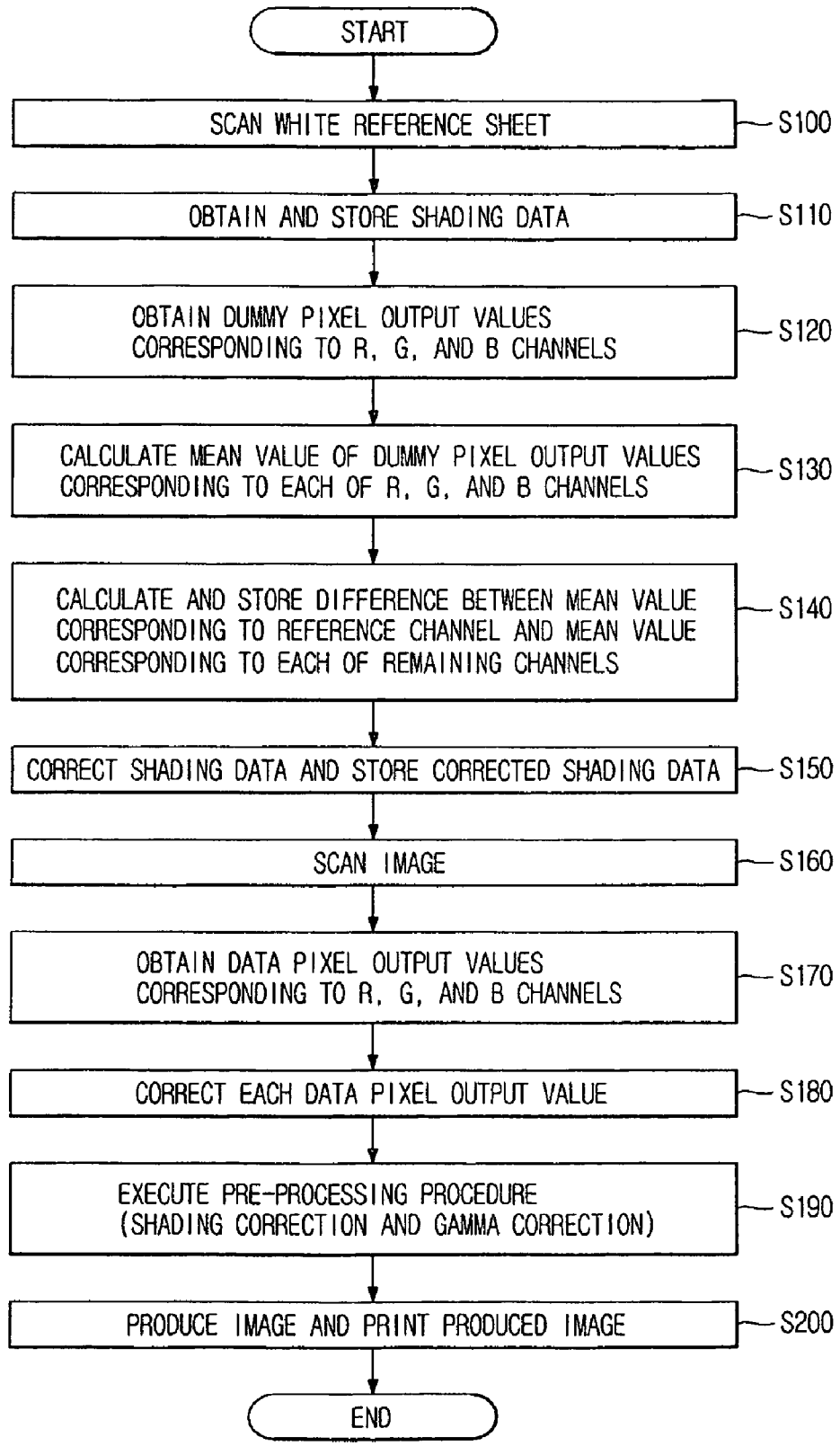
FIG. 3 is a flow chart illustrating a method for controlling the image forming apparatus according to the illustrated embodiment of the present general inventive concept.
Figure 4:
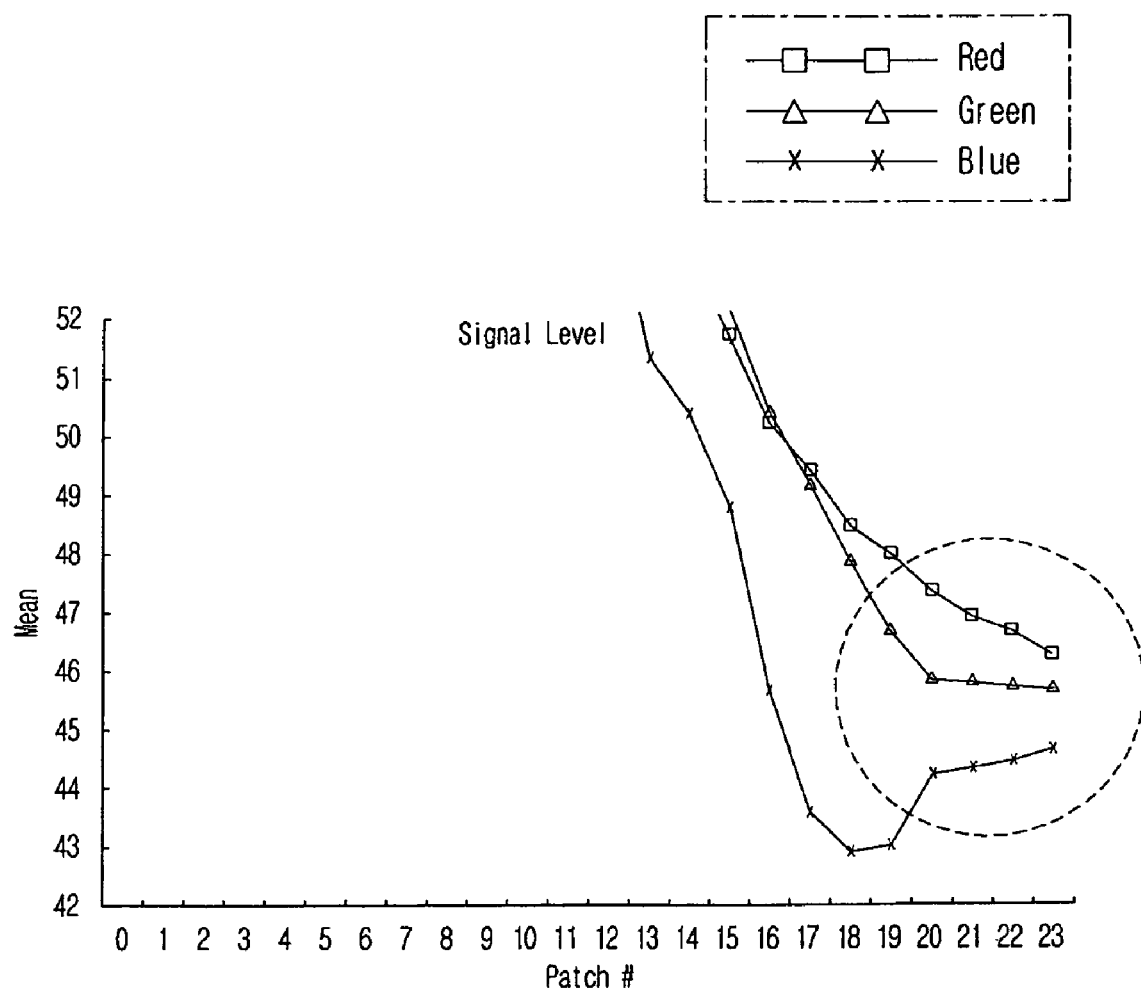
FIG. 4 is a graph illustrating R, G, and B signal levels of a scanned image before an offset correction thereof in the image forming apparatus according to the illustrated embodiment of the present general inventive concept.
Figure 5:
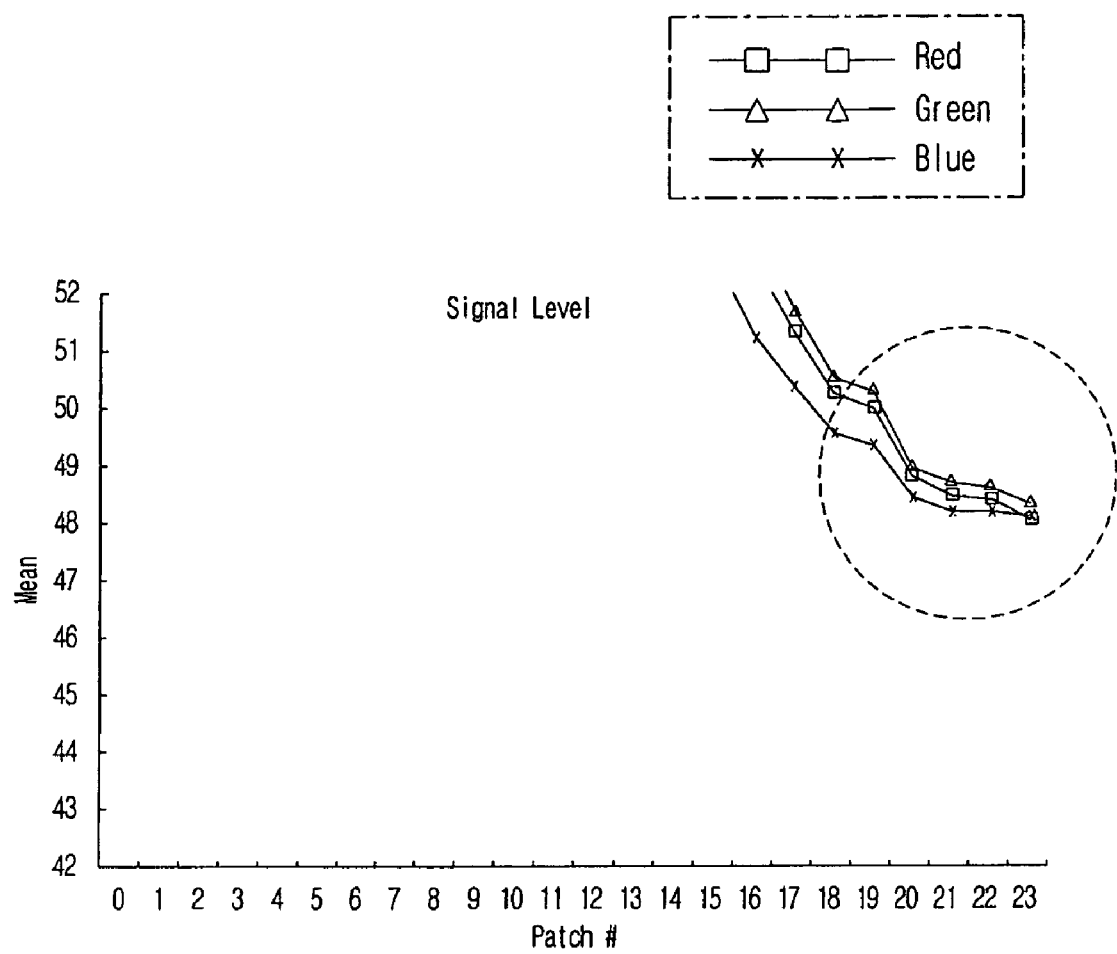
FIG. 5 is a graph illustrating R, G, and B signal levels of the scanned image after an offset correction thereof in the image forming apparatus according to the illustrated embodiment of the present general inventive concept.
Figure 6:
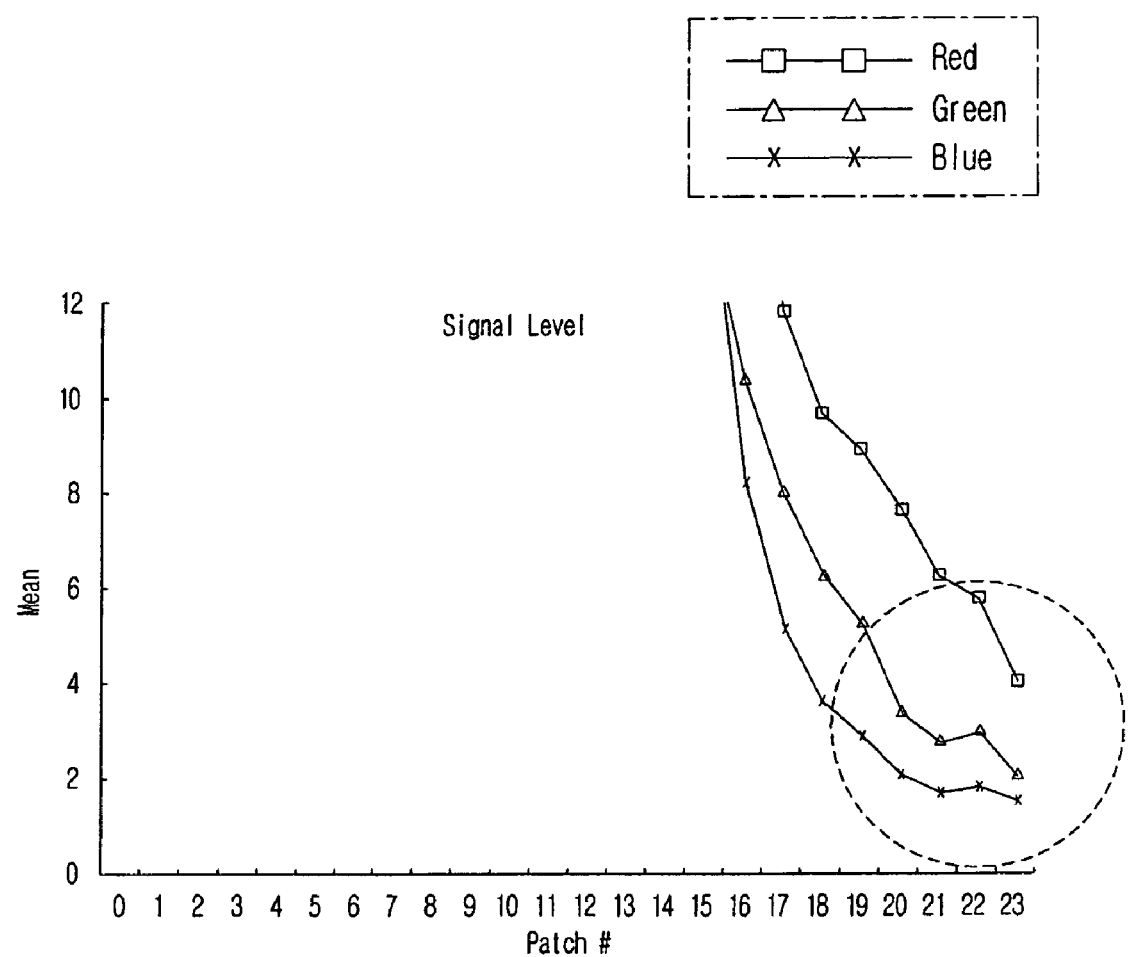
FIG. 6 is a graph illustrating R, G, and B signal levels of a shading-corrected image before an offset correction thereof in the image forming apparatus according to the illustrated embodiment of the present general inventive concept.
Figure 7:
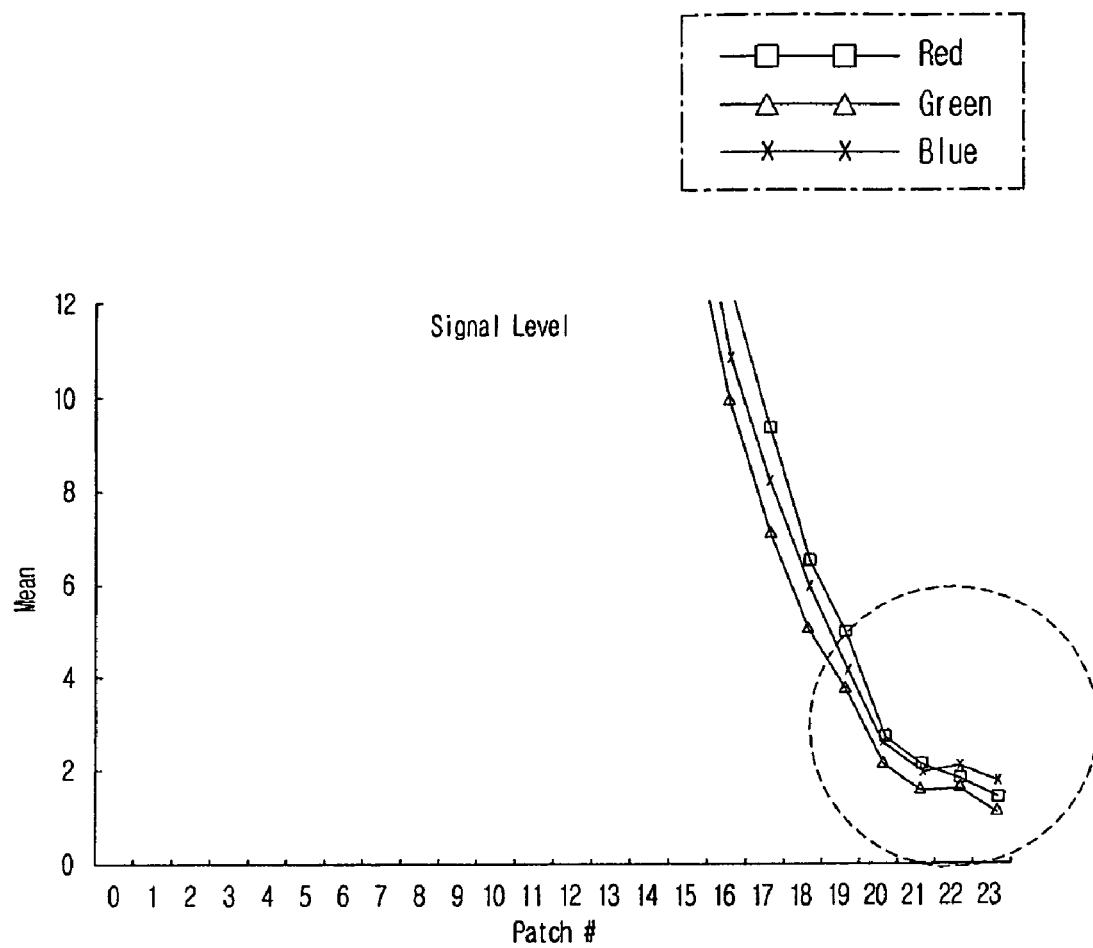
FIG. 7 is a graph illustrating R, G, and B signal levels of a shading-corrected image after an offset correction thereof in the image forming apparatus according to the illustrated embodiment of the present general inventive concept.
Figure 8:
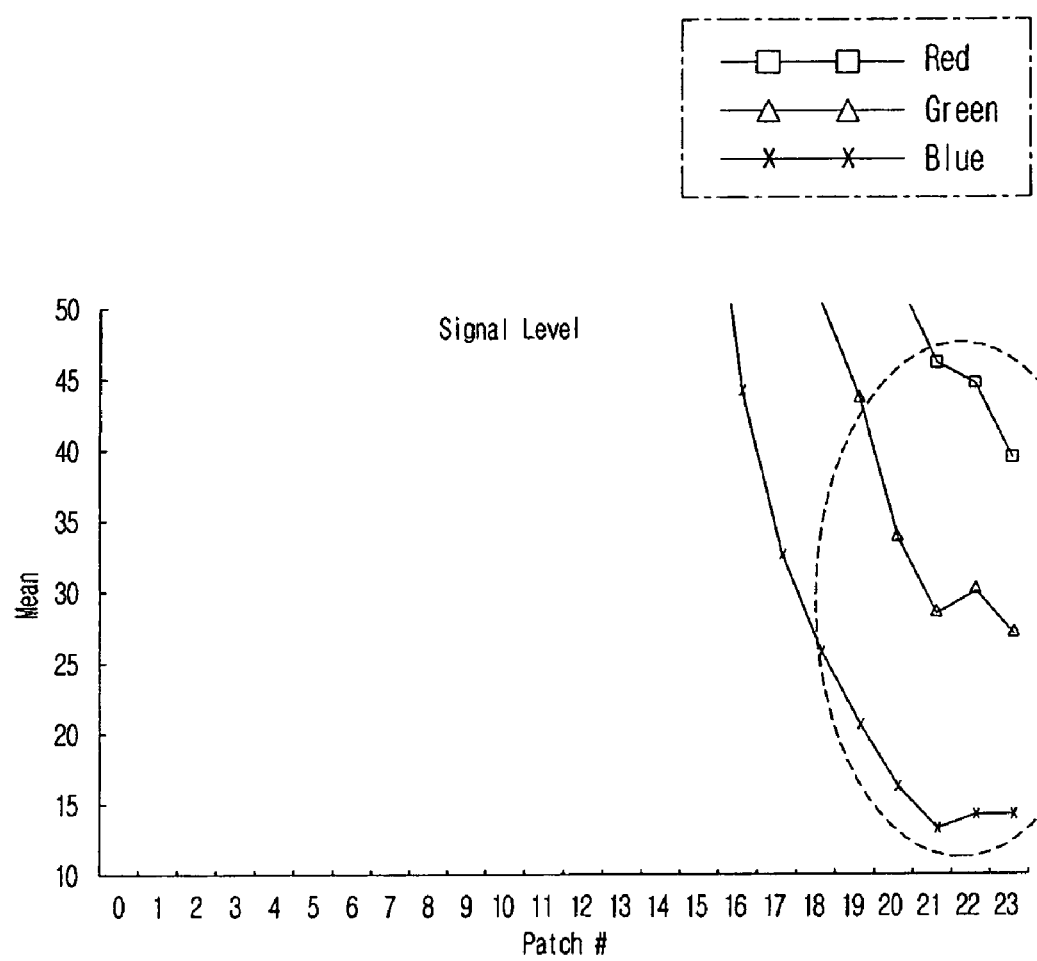
FIG. 8 is a graph illustrating R, G, and B signal levels of a gamma-corrected image before an offset correction thereof in the image forming apparatus according to the illustrated embodiment of the present general inventive concept.
Figure 9:
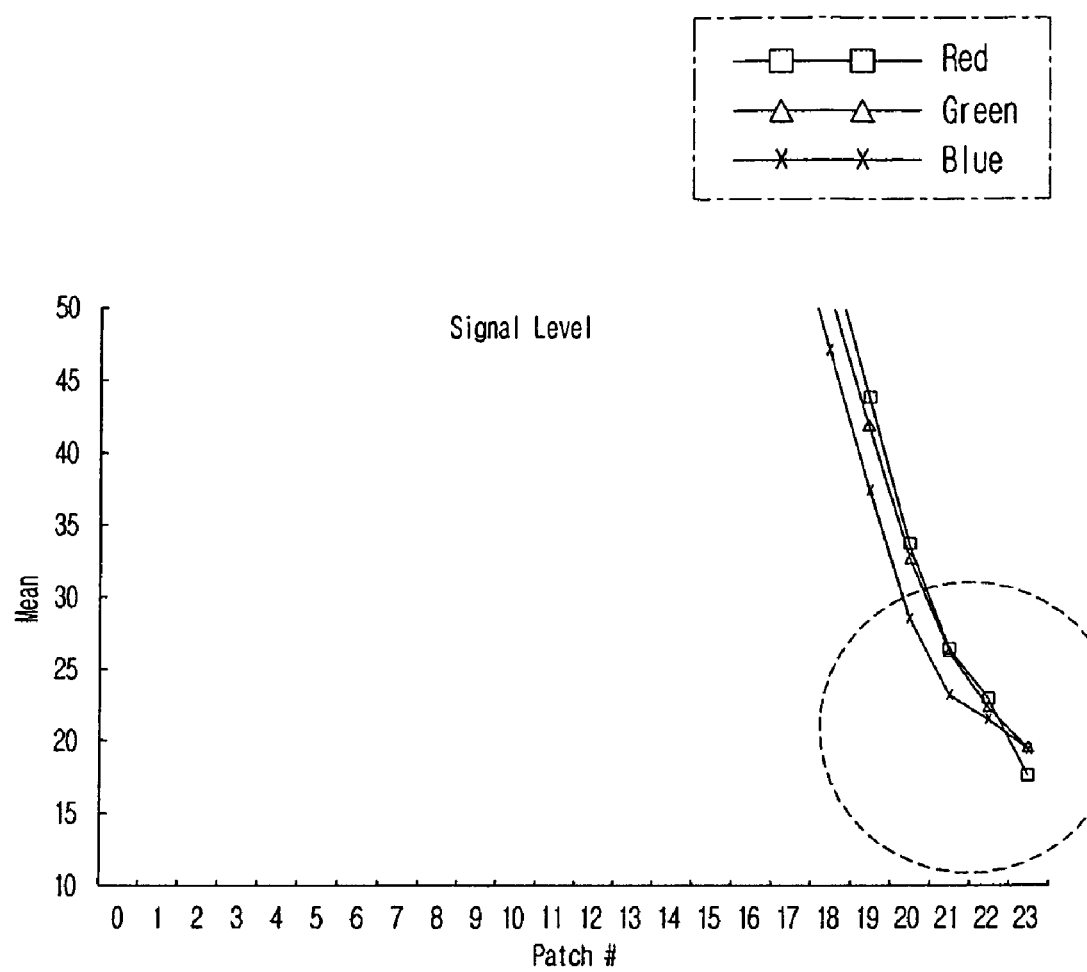
FIG. 9 is a graph illustrating R, G, and B signal levels of a gamma-corrected image after an offset correction thereof in the image forming apparatus according to the illustrated embodiment of the present general inventive concept.

The above-described control operations will be described in more detail with reference to FIG. 3. In the illustrated embodiment, the controller 40 performs an operation to optically engage the image sensor module 20 to the white reference sheet provided at one side of the flat bed, on which the scan object 10 is laid, and to scan the white reference sheet at operation S100, an operation to obtain and store shading data at operation S110, an operation to obtain dummy pixel output values corresponding to each of the R, G, and B channels from the scanned image at operation S120, an operation to calculate a mean value of the dummy pixel output values corresponding to a reference one of the R, G, and B channels and a mean value of the dummy pixel output values corresponding to each of the remaining two channels other than the reference channel at operation S130, an operation to calculate a difference of the mean value corresponding to each of the channels other than the reference channel from the mean value corresponding to the reference channel at operation S140, an operation to correct the shading data at operation S150, and an operation to produce image data and to correct the image data at operation S160.

Hereinafter, the above-described operations will be described one by one in detail. Upon receiving a scanning signal from the user, the controller 40 optically engages the image sensor module 20 to the white reference sheet provided at one side of the flat bed, on which the scan object 10 is laid, and controls the image sensor module 20 to scan the white reference sheet, in operation S100.

In operation S110, the controller 40 obtains shading data in accordance with the scanning operation of the image sensor module 20, and stores the obtained shading data in the shading memory 50. Thereafter, in operation S120, the controller 40 obtains dummy pixel output values corresponding to each of the R, G, and B channels from the data stored in the shading memory 50. The obtained dummy pixel output values are stored in the shading memory 50.

After obtaining the dummy pixel output values corresponding to each of the R, G, and B channels, the controller 40 calculates mean values of the dummy pixel output values respectively corresponding to the R, G, and B channels, namely, RG, GB, and BR mean values, in operation S130. That is, the controller 40 calculates a mean value of the dummy pixel output values corresponding to a reference one of the R, G, and B channels and a mean value of the dummy pixel output values corresponding to each of the remaining two channels other than the reference channel.

Thereafter, in operation S140, the controller 40 calculates a difference of the mean dummy pixel output value corresponding to each of the channels other than the reference channel from the mean dummy pixel output value corresponding to the reference channel. The calculated mean value difference between the reference channel and each channel other than the reference channel is stored in the shading memory 50.

Following operation S140, the controller 40 applies the mean dummy pixel output value difference associated with each channel to the associated value of the shading data through an addition or deduction operation, in order to equalize the black levels of the shading data respectively associated with the R, G, and B channels. Thus, the shading data is corrected. The corrected shading data is stored in the shading memory 50.

Thereafter, the scan object 10 laid on the flat bed is scanned by the image sensor module 20 in operation S160.

In accordance with the scanning operation carried out for the scan object 10, the controller 40 obtains data pixel output values respectively corresponding to the R, G, and B channels in operation S170.

In operation S180 following operation S170, the controller 40 applies the mean value difference between the reference channel and each channel other than the reference channel, which has been calculated and stored in operation S140, to the data pixel output value corresponding to the same channel, through an addition or deduction operation. Thus, the data pixel output values respectively corresponding to the R, G, and B channels are corrected.

Subsequently, in operation S190, a pre-processing procedure is executed to perform a shading correction and a gamma correction, using the shading data stored in operation S150.

After the execution of the pre-processing procedure, image data is produced, and printing of the produced image data is executed in operation S200.

As apparent from the above description, in the illustrated embodiment of the present general inventive concept, output values for R, G, and B dummy pixels are obtained using a white reference sheet. Based on the R, G, and B dummy pixel output values, an offset correction value between the reference channel and each of the channels other than the reference channel is generated. Using the generated offset correction value, the shading data is corrected. Also, the data pixel output value output in accordance with the scanning operation for the scan object in association with each channel is corrected using the associated offset correction value. After the execution of the pre-processing procedure, image data is produced, and printing of the produced image data is executed. In accordance with the above-described procedures, it is possible to correct a possible offset value difference among the color channels, and thus to achieve an improvement in the color quality of the final scanned image. Such results can be identified from a scanned image, a shading-corrected image, and a gamma-corrected image obtained before or after an offset correction, as illustrated in FIGS. 4 to 9.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
a white reference sheet provided at one side of a flat bed, on which an object to be scanned is laid;
an image sensor module including an image sensor to detect light reflected from the white reference sheet in a scanning operation for the white reference sheet and light reflected from an image on the object in a scanning operation for the object, and to output analog image signals respectively corresponding to the reflected lights;
an analog front end to convert each analog image signal output from the image sensor to a digital image signal;
a shading memory to store shading data obtained in the scanning operation for the white reference sheet; and
a controller to calculate differences of mean values of dummy pixel values included in the stored shading data corresponding to R, G, and B channels of the image sensor, the dummy pixel values corresponding to dummy pixel areas positioned outside of the white reference sheet, and to correct the stored shading data, based on the calculated differences of mean values, and to correct image data outputs generated from the R, G, and B channels in the scanning operation for the object, based on the calculated differences of mean values.

2. The image forming apparatus of claim 1, wherein the controller stores the calculated mean value associated with each of the R, G, and B channels in the shading memory.

3. The image forming apparatus of claim 1, wherein the controller applies the calculated difference between the mean value corresponding to a specific one of the R, G and B channels and each of the remaining two channels other than the specific channel, to an associated value of the shading data through an addition or deduction operation, to correct the shading data.

4. The image forming apparatus of claim 1, wherein the controller applies the calculated differences of mean values corresponding to the R, G, and B channels to the associated image data outputs, respectively, through an addition or deduction operation, to correct the image data outputs.

5. The image forming apparatus of claim 1, wherein the image forming apparatus is a scanning unit or a complex machine.

6. A method of controlling an image forming apparatus, the method comprising:
scanning a white reference sheet by an image sensor, to obtain shading data;
calculating mean values of dummy pixel values included in the shading data corresponding to R, G, and B channels of the image sensor, the dummy pixel values corresponding to dummy pixel areas positioned outside of the white reference sheet;
calculating differences of the mean values of the dummy pixel values; and
correcting the stored shading data, based on the calculated differences of the mean values, and correcting image data outputs generated from the R, G, and B channels in a scanning operation for an object, based on the calculated differences of the mean values.

7. The method of claim 6, wherein the calculated difference of mean value corresponding to a specific one of the R, G, and B channels and each of the remaining two channels other than the specific channel is applied to an associated value of the shading data through an addition or deduction operation, for the correction of the shading data.

8. The method of claim 6, wherein the calculated differences of mean values corresponding to the R, G, and B channels are applied to the associated image data outputs, respectively, through an addition or deduction operation, for the correction of the image data outputs.

9. An image forming apparatus comprising:
a shading memory to store shading data according to a signal to correspond to a reference sheet;
a controller to correct the stored shading data according to differences of mean values of dummy pixel values included in the stored shading data corresponding to plurality of color channels of image data, the dummy pixel values corresponding to dummy pixel areas positioned outside of the reference sheet, and to correct the image data according to the corrected shading data.

10. The image forming apparatus of claim 9, wherein the controller stores the calculated mean value associated with each of the plurality of color channels in the shading memory.

11. The image forming apparatus of claim 10, wherein the controller applies the calculated difference of mean value corresponding to a specific one of the plurality of color channels and each of the remaining two channels other than the specific channel, to an associated value of the shading data through an addition or deduction operation, to correct the shading data.

12. The image forming apparatus of claim 9, wherein the controller applies the calculated differences of mean values corresponding to the plurality of color channels to the associated image data outputs, respectively, through an addition or deduction operation, to correct the image data outputs.

13. The image forming apparatus of claim 9, wherein the image forming apparatus is a scanning unit or a complex machine.

14. The image forming apparatus of claim 9, further comprising: an analog front end to convert each analog image signal output from the image sensor to a digital image signal.

* * * * *